United States Patent
Berrigan

[19]

[11] Patent Number: 6,092,302
[45] Date of Patent: *Jul. 25, 2000

[54] ABSORBENT FIBROUS GRANULES

[75] Inventor: Michael R. Berrigan, Oakdale, Minn.

[73] Assignee: 3M Innovative Properties Company, St. Paul, Minn.

[*] Notice: This patent is subject to a terminal disclaimer.

[21] Appl. No.: 09/000,095

[22] PCT Filed: Apr. 25, 1997

[86] PCT No.: PCT/US97/06913

§ 371 Date: Jan. 16, 1998

§ 102(e) Date: Jan. 16, 1998

[87] PCT Pub. No.: WO97/41188

PCT Pub. Date: Nov. 6, 1997

[51] Int. Cl.⁷ .................................................. F26B 5/06
[52] U.S. Cl. ........................... 34/303; 34/329; 502/402; 502/418
[58] Field of Search .................... 34/302, 303, 329, 34/333, 334; 119/171, 172, 173; 502/402, 404, 412, 418

[56] References Cited

U.S. PATENT DOCUMENTS

| | | | |
|---|---|---|---|
| 2,649,759 | 8/1953 | Gibbs | 119/1 |
| 2,692,861 | 10/1954 | Weeks | 252/88 |
| 3,617,564 | 11/1971 | VanderHooven et al. | 210/40 |
| 3,770,575 | 11/1973 | Ball | 162/100 |
| 3,876,497 | 4/1975 | Hoffman | 162/189 |
| 4,102,783 | 7/1978 | Zenno et al. | 210/36 |
| 4,240,800 | 12/1980 | Fischer | 502/404 X |
| 4,341,180 | 7/1982 | Cortigene et al. | 119/1 |
| 4,356,060 | 10/1982 | Neckermann et al. | 162/181.6 |
| 4,374,794 | 2/1983 | Kok | 264/122 |
| 4,409,925 | 10/1983 | Brundrett et al. | 119/1 |
| 4,519,918 | 5/1985 | Ericsson et al. | 210/680 |
| 4,537,877 | 8/1985 | Ericsson | 502/402 |
| 4,560,527 | 12/1985 | Harke et al. | 264/500 |
| 4,621,011 | 11/1986 | Fleischer et al. | 428/221 |
| 4,670,156 | 6/1987 | Grenthe | 210/691 |
| 4,734,393 | 3/1988 | Lowe et al. | 502/404 X |
| 4,753,917 | 6/1988 | Grenthe | 502/404 X |
| 5,358,607 | 10/1994 | Ellis | 162/100 |
| 5,763,083 | 6/1998 | Berrigan | 428/402 |
| 5,901,661 | 5/1999 | Pattengill et al. | 119/173 |

FOREIGN PATENT DOCUMENTS

| | | | |
|---|---|---|---|
| 49-084980 | 8/1974 | Japan . | |
| 58-199041 | 11/1983 | Japan | C09K 3/32 |
| WO 92/07918 | 5/1992 | WIPO | C09K 3/32 |

Primary Examiner—Stephen Gravini
Attorney, Agent, or Firm—Gary L. Griswold; Robert W. Sprague; William J. Bond

[57] ABSTRACT

There is provided a cellulosic-based fiber granule with added non self-associating particulates or fibers. The resulting granule is free-flowing with a densified outer surface and is capable of removing substantially all oil or other fluids from a flat surface such as a floor. The granule is also capable of being incinerated by being formed substantially of organic materials. Cellulosic plant fibers form at least 10 percent up to 99 percent of the granule. There is also provided a method for forming the incineratable absorbent, free-flowing granules.

55 Claims, 1 Drawing Sheet

ABSORBENT FIBROUS GRANULES

BACKGROUND AND FIELD OF THE INVENTION

The present invention relates to the field of fibrous granules or agglomerates used as absorbents.

Small particulate-like or agglomerate absorbents have long been used for absorbing liquids particularly water and/or oils. However, the nature of the specific absorbents designed and used for particular end uses has changed significantly over time. Depending on the particular end use requirements and available materials, absorbents in use today are quite different in regard to their composition, physical properties and/or chemistry. Typical large volume end uses for particulate-like absorbents include animal bedding, cat liter, oil absorbents, water absorbents or absorbents used to remove oil from water surfaces. For example, with animal bedding absorbents it has been described as important that the absorbent material be non-toxic, have antibacterial properties and have high absorption capacity for urine and the like. With cat liter, some of the same considerations are present as with animal bedding, however, there is also a need for more rapid absorption and the ability of the material to clump or hold together when wetted becomes important. With oil absorbent materials generally the absolute oil absorbing capacity has been considered important in the prior art, as well as the density and integrity of the material. For absorbing oil from a (e.g., factory) floor generally a more dense, coherent material is required so as to avoid airborne dust, which causes difficulties with people and machinery, ease of removal and safety concerns. For absorbing oil from the surface of water, it is generally considered necessary that the absorbents be both coherent when wet and less dense than water, both before and after the material absorbs oil and/or water.

For example, U.S. Pat. No. 2,649,759 describes that for animal bedding typical common absorbents used are organic-type materials such as straw, peat moss, wood shavings as well as diatomaceous earth. This patent proposed use of a specific clay which is alleged as superior in view of its high absorbency, anti-bacterial properties, non-dusting properties and the fact that it is non-toxic.

U.S. Pat. No. 3,617,564 proposes an absorbent of low density corn cob granules which are formed of the cob with the center core removed. These granules are stated as having suitable properties, without any further treatment, for removing oil from fresh or salt water. Hydrophilic organic fibers have also been described as acceptable oil and/or water absorbents without a resin treatment. U.S. Pat. Nos. 4,829,045 and 4,409,925 propose adding calcium sulfate and Plaster of Paris, respectively to augment the properties of organic hydrophilic fibers. In U.S. Pat. No. 4,829,045 the natural fibers are peat fibers, which are pelletized. Calcium sulfate is added to act as a binding agent and a fire retardant. In U.S. Pat. No. 4,409,925 ground waste paper is dry mixed with Plaster of Paris and then agglomerated by the addition of water droplets. The size and density of the particles formed depend on the size of the water droplets. The resulting material is described as an oil and water absorbent and as performing superior to a clay product. The Plaster of Paris, although described as used in the prior art as an oil absorbent by itself, is used in this patent primarily for sanitizing purposes and is reported as actually reducing the oil and water absorption properties of the fibrous agglomerate material.

Resins are often used to modify the surface properties of organic fibers or particles to allegedly make the fibers or particulates better oil absorbents. For example, U.S. Pat. No. 2,692,861 describes an oil absorbent material for use as a floor sweeping composition. It describes conventional materials as sawdust, clays and sand. In order to improve the properties of these conventional materials the patent proposes coating the materials with resins which are "substantially free of paraffinic hydrocarbons". U.S. Pat. No. 5,308,497 proposes using a phenolic resin for treating fibers to make oil absorbent sheet materials, e.g., sheets of woven or nonwoven treated fibers. U.S. Pat. Nos. 4,519,918 and 4,537,877 use reject paper pulp fibers that are treated with specific resins to make them hydrophobic followed by dewatering, shredding and drying to form general purpose oil-absorbent materials.

The recognition that fibrous cellulosic organic fibers can function as oil and/or water absorbents has led to the use of fibrous waste sludge or white water waste solids as a raw material for forming a variety of absorbent products. This material represents an environmental and disposal problem for paper making companies and is a byproduct of primary pulping operations, recycle streams or waste paper pulping and the like. Generally, waste sludge or white water is a dilute stream of fibers unsuitable for paper making. The fibers may be too large or too small. Waste sludge can also include significant amounts of inorganic fillers (particularly if the sludge comes from a waste paper pulping operation). U.S. Pat. No. 3,876,497 describes a method of disposing of waste paper sludge by oxidation. U.S. Pat. Nos. 5,478,441, 5,332,474 and 5,423,993 describe methods of recovering the small or fibers for use in paper making. U.S. Pat. No. 5,240,565 converts the waste sludge into energy and charcoal. U.S. Pat. No. 5,346,549 forms waste sludge solids into a building material (e.g., concrete filler) by mixing it with coal ash.

Waste paper sludge is described as a preferred feed material in U.S. Pat. Nos. 4,670,156; 4,975,108; 4,753,917 and 3,770,575 which patents describe methods for making hydrophobic cellulosic fibers by rapidly drying waste paper sludge, pulp or some other fibrous materials. U.S. Pat. No. 3,770,575 states that the fibers need to be treated with a sizing agent, e.g., stearic acid anhydride, if the treated fibers are to be used to absorb oil from the surface of water. However, U.S. Pat. Nos. 4,670,156 and 4,753,917 do not require the use of a sizing agent. The pulp used in both of these patents was sulfite reject fibers which were exemplified as being made hydrophobic by high temperature flash drying alone. In U.S. Pat. No. 4,975,108 flash dried reject pulp fibers were mixed with a water soluble material, e.g., fertilizer, forming a controlled release material for use in soil.

U.S. Pat. Nos. 4,374,794 and 4,356,060 also describe treating a waste paper sludge. In the 4,374,794 patent, the sludge is dewatered, extruded into pellets and dried at temperatures ranging from 100° C. to 150° C. to form an oil and water absorbent material. U.S. Pat. No. 4,356,060 dries paper making waste sludge at a temperature of about 350° F. after which it is sent to a hammermill where it is disintegrated into a soft, fluffy material which is used as an insulation product. For fire retardency purposes the material preferably contains at least 30 percent clay.

The use of cellulose waste sludge for forming a kitty liter product is proposed in U.S. Pat. Nos. 4,341,180 and 5,215,041. In U.S. Pat. No. 4,341,180 waste sludge fibers are dewatered, chopped into small pieces, mixed with sodium bicarbonate and then pelletized in a conventional pelletizer. A fluidized bed drier is used to dry the formed pellets. U.S. Pat. No. 4,215,041 mixes pulverized dried waste sludge fibers with 30 to 34 percent lime or gypsum, and then adds water to form a slurry. The wet slurry is then granulated in a circular drum followed by sizing, dusting with a mineral powder and drying in a rotating drum. The resulted particles formed are allegedly hard granules suitable for use as a cat liter.

U.S. Pat. Nos. 4,931,139; 4,560,527 and 4,621,011 describe surface conditioning of agglomerates or granular particles formed with organic fibrous material, preferably waste paper sludge fibers. This surface treatment is exemplified as accomplished in a rotating drum, preferably with added water to cause any upstanding fibers to be folded back into the fibrous agglomerates, or otherwise formed granular particles. In U.S. Pat. Nos. 4,621,011 and 4,560,527 dry waste or recycle paper is first fiberized by a size reduction device, such as a hammermill then further treated. However, this size reduction step is stated as unnecessary and problematic when wet cellulosic fibers are used, such as from waste paper sludge, as the hammermills plug up when the moisture content of the cellulosic material is above 20 weight percent. Moist fibers, regardless of whether they were first subject to a size reduction step or not, are then agglomerated in a horizontal rotating drum which also serves to "compact" the skins of the fiber agglomerates. Further, compaction can occur in a secondary rotating drum or fluidized bed drier. The resulting material is described as particularly well-suited for use as a kitty litter material. U.S. Pat. No. 4,931,139 is directed at a method of providing an oil absorbent material which addresses perceived problems with prior art processes which required pelletization and/or high amounts of inorganic fillers. These prior art fibrous particles were allegedly too dense, had dusting problems and/or "were fuzzy". The absorbent material in this patent was formed by flocculating waste paper sludge fibers into a mat or sheet which was then shredded and conditioned in a water mist (the shredded particles were tumbled in the presence of water to fold in the fuzzy outer fiber ends). The resulting product was described as a low density material which had a good absorption capacity for oil.

U.S. Pat. Nos. 4,721,059 and 4,734,393 also describe an oil absorbent material formed with waste paper sludge fibers. The sludge fibers are dewatered and then shredded to a fine particle size, less than 10 mm, followed by standard pelletization and drying in a rotary drum drier. The resulting materials allegedly showed good absorbency for oil.

BRIEF SUMMARY OF THE INVENTION

The present invention provides cellulosic plant fiber granules comprised of 10 to 99 weight percent self associating, cellulosic, plant fibers and, in a first embodiment, from 1 to 90 weight percent, preferably 1 to 50 weight percent of particulate materials, having an aspect ratio of less than 3, which particulates are non-film forming or non-self associating, insoluble and inorganic or organic. However, the total percent of inorganic particulate materials in the granules should be less than 36 percent by weight of the granules, preferably less than 30 percent, most preferably less than 25 percent. The particulates have an average diameter of from 2 to 250 microns or micrometers, preferably 5 to 200 micrometers.

In a second embodiment non-self associating inorganic or organic fibers are mixed with the self associating cellulosic plant fibers. These fibers have an aspect ratio of greater than 3, preferably from 3 to 600 and an average diameter of from 0.1 to 100 micrometers, preferably 0.3 to 25 micrometers, most preferably greater than 1 micrometer. Further, the ratio of the average narrowest width of the formed fiber granule to the average length of the fibers (LW ratio) is greater than 1 preferably from 1.1 to 1200; most preferably from 1.2 to 50. Generally where the fibers used have a range of fiber lengths, the fiber length distribution is such that less than 10 percent, preferably less than 5 percent, of these added fibers are 50 percent longer than the maximum providing a LW ratio of 1.1, most preferably 5 percent or fewer of the fibers are more than 30 percent longer than the average fiber length providing an LW ratio of 1.1.

In both embodiments, the formed granules have a densified or compacted outer surface with substantially no cellulosic fibers protruding from most fiber granules, by more the 1 mm from the outer densified surface of the granules. With the second embodiment, a certain portion of the non-cellulosic fibers can protrude at lengths up to 1 mm, preferably less than 0.5 mm from the outer surface of the granules. However, the total amount of any protruding fibers can not adversely effect flowability of the granules as will be described below.

In both embodiments, the total amount of inorganic materials in the granules, in the form of fibers and/or particulates, should be less than 36 percent by weight of the granules, preferably less than 30 percent, to enable the absorbent granules to be incinerated after use and minimize the production of ash.

DETAILED DESCRIPTION OF THE PREFERRED EMBODIMENTS

Figure 1:
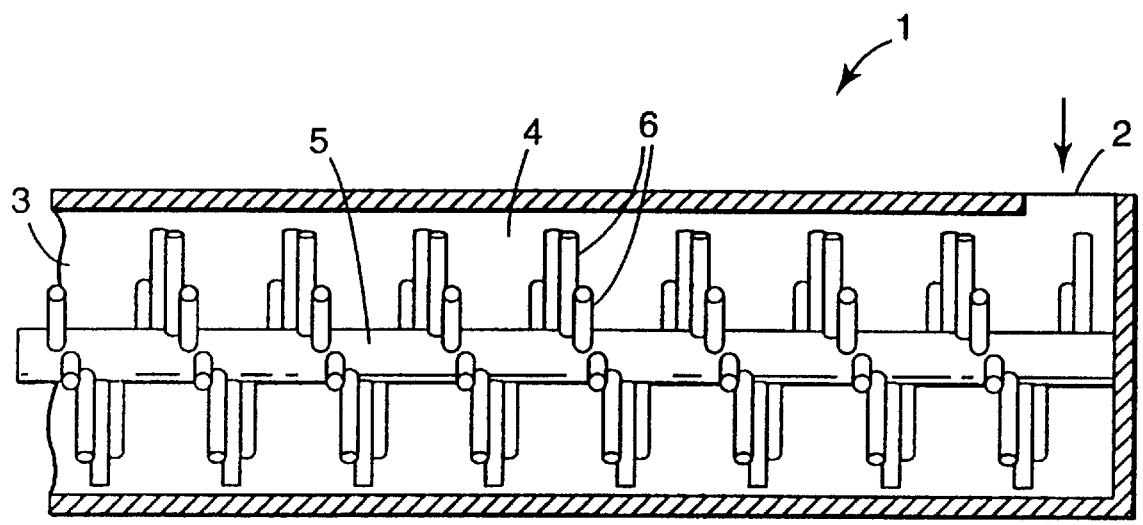
FIG. 1 is a schematic view of a pinmill, preferably used in the invention process.

The present invention is directed at providing incineratable, fibrous, absorbent granular materials formed from at least in part low cost cellulosic plant fibers which granules are particularly well suited for absorbing surface liquids such as aqueous fluids or oil from a floor-like surface. The invention absorbent granules leave little or no liquid surface residue, are easily swept up without dusting, are generally substantially non-tacky following absorption of oil, have a density such that they do not blow away and are susceptible to being recycled for their energy value providing a material with a relatively low ash content.

The cellulosic plant fibers usable in forming the absorbent granular products of the invention can be any self associating cellulosic plant fiber which is suitable for agglomeration and compaction into a granular form. From a cost and environmental standpoint, a preferred cellulose plant fiber source is waste paper or paper mill waste sludge or white water fibers. However, any conventional vegetative self associating cellulosic fibers, which can be agglomerated into a relatively dense flowable granule can be employed to form the invention absorbent fibrous granules. Generally, suitable cellulosic plant fibers are capable of self associating by microfibril entanglement between the cellulosic fibers and by hydrogen bonding. The bending resistance of suitable cellulosic plant fibers is less than these bonding forces such that the cellulosic fibers can be formed into granules with little or no protruding plant fiber ends with conventional agglomeration and surface compaction or densification techniques. Preferred cellulosic fibers are those which can be formed into a paper by self association without added resin binders. Wood pulp fibers are particularly preferred in terms of cost and availability.

Paper mill waste sludge or white water is a primarily fibrous waste material resulting from the paper making process. This sludge, particularly if from a recycled paper feed stream, may also contain significant amounts of clay-like materials, generally film forming clays such as Kaolin clay or China clay. Generally, waste paper sludge must be land filled, burned or suitably treated to form a useful secondary product other than paper, even if some fibers are recovered and recycled into the primary pulp feed stream.

If dry cellulosic plant fibers are employed to form the invention granules the materials, such as recycled paper, forming the source of these fibers may be treated as described in U.S. Pat. No. 4,560,527 where the material is first size reduced in a hammermill, or like device, to a particle size of from 1 to 10 mm. During the particle size reduction of the cellulose plant fiber materials the non-film forming or non-self associating particles or fibers of the invention may be added and also subjected to size reduction. Size reduction of the added non-self associating fibers or particulates can also be done before being added to the self associating cellulosic fibers by conventional techniques if required.

Suitable particulate-type materials used in the first embodiment of the invention are non-film forming, insoluble particles with an average diameter of from 2 to 250 micrometers, preferably 5 to 200 micrometers and an aspect ratio of less than 3. These particles would include plastic beads, titanium dioxide, glass, ceramic beads or the like. The particles generally are used in an amount ranging from preferably 1 to 50 percent by weight (all percents are weight percents unless otherwise indicated), most preferably from 1 to 30 percent. However, if inorganic particles are used, the total inorganic particle content of the granules should constitute no more than 36 percent of the formed granule, preferably less than 30 percent, most preferably less than 20 percent. If film forming, self associating, binder clays or particles are present in the feed stream these can be tolerated in amounts up to 30 percent by weight of the granule. Generally, these film forming particulates are fine inorganic clays, line, gypsum or the like. However, if these generally undesirable inorganic materials are present the added non-film forming materials should be selected so that the total inorganic content is no more than 36 percent of the granules and the cellulosic plant fiber constitutes at least 10 percent of the formed granules. Film forming particulates or bonding particulates are not desired if they can be avoided.

In a second preferred embodiment there are used water and oil insoluble, non-self associating fibers, preferably synthetic organic polymer fibers, however, inorganic fibers can also be used. The non-self associating fibers, which have a length suitable for use in the invention granules, have a fiber length distribution and/or fiber bending resistance such that at most only a small portion of the fibers protrude out of the surface of the formed granules by more than 1.0 mm, preferably less than 0.5 mm after being treated in accordance with the invention process. Possible organic non-self associating fibers include staple-type organic fibers, melt-blown microfibers or organic non-self associating fibers such as animal hair, silk, unpulped cotton or the like. Preferred organic fibers are formed of thermoplastic synthetic polymeric materials such as polyolefins, polyesters, nylons, polyamides or the like. The nature of the fibers does not appear to be critical except that the fibers when in the granules should not form into a coherent mass or film with itself. Non-self associating fibers and/or particulates used in the granules, can form a coherent mass by self association or other means such as fiber melting or continuous resin bonding. However, the fibers may be intermittently bonded to some extent by, e.g., particulate resins or the like. Lower cost polyolefin or polyester type fibers are preferred in terms of cost and disposability by incineration of the granules after use.

Generally, the non-self associating fibers are present at an amount of from 1 to about 80 to 90 percent of the granules. With smaller diameter fibers, generally higher weight percents can be used. Preferably the non-self associating fibers constitute from 1 to 70 percent, most preferably from 1 to 40 percent, even more preferably 1 to 25 percent of the granule. Generally, as the weight percent of the added non-self associating fibers increase to their maximum, the Surface Residue Value increases beyond acceptable levels and/or the granules flowability or Flow Value becomes poor. The point at which this maximum is reached appears to be dependent on the non-self associating fiber diameter or fiber bending resistance. Generally, lower levels of added non-self associating fibers are preferred as providing the best performance at the lowest cost (generally higher non-self associating fiber loading levels that work effectively do not provide any significant performance advantage over lower non-self associating fiber loading levels that work effectively). If inorganic non-self associating fibers are used they should be used such that the total inorganic content of the granules is no more than 36 percent of the formed granules, preferably less than 30 percent of the formed granules.

The density of the formed granules should be from about 0.15 to 0.5 grams per cubic centimeter, preferably 0.2 to 0.45 and most preferably 0.3 to 0.45. If the average density is less than 0.15 the granules are too light and easily displaced by air currents and difficult to sweep and/or keep in place. If the density is greater than 0.5 the granules generally have an excessive content of higher density inorganic materials which results in a high ash content rendering the granules unsuitable for incineration and making them less oil absorbent overall. The density of the granules can be adjusted by use of heavier particulates or fibers added to the cellulosic, self associating, plant fibers and/or by use of standard densification and surface compaction techniques.

The majority of the granules preferably should have no fibers protruding more than 1.0 mm from the outer surface of the granules, providing granules which are somewhat smooth in appearance, but random in shape, and as a whole are free flowing. A few random cellulosic fibers or fiber bundles, due to the random nature of the processing, may protrude by more than 1.0 mm from select granules. This random fiber protrusion is acceptable if the granules as a whole are still free flowing as defined herein.

Due to the relatively stiff nature of some of the non-cellulosic fibers used, e.g., larger diameter non-cellulosic fibers (fibers with diameters of greater than 10 microns, up to 50 microns or more), certain amounts of these fibers will tend to protrude from the surface of the granule even if the length of the fiber is less than the width of the granule. However, it has been found that the granules can remain free flowing and function to remove surface oil if, at least with these larger diameter fibers, the ratio of the granules smallest average cross-sectional width dimension to the average fiber length (of these larger diameter fibers) (LW ratio) is greater than 1.1, preferably greater than 1.2. It has been found that this LW ratio ensures that the formed granule has a minimal degree of protruding fibers such that the granules as a whole are free-flowing and remove surface oil or other liquids.

The granules are generally from 0.1 to 8 mm in average diameter, preferably 0.5 to 6 mm. The shape is preferably generally non-circular to minimize rolling. Suitable shapes include asymmetrical shapes such as pancake shapes or other shapes flattened on at least one face.

The granules are absorbent and advantageously leave an oil Surface Residue Value (after 8 hours), as defined below, of less than 0.5 grams, preferably less than 0.2 grams and most preferably less than 0.1 grams with respect to a standard 20 weight motor oil. Although the absorbancy of the invention granules is defined relative to standard 20 weight motor oil, the absorbancy of the granules has also been shown relative to aqueous liquids providing Surface Residue Values of less than about 0.01 grams relative to water and less than about 0.5 grams relative to synthetic blood (as defined herein). This is a property not possessed by oil absorbent fibrous granules in general, which may be oil absorbent in a liquid bath but lack the necessary capillary forces to remove substantially all oil, or other liquids from a floor or like hard surface. The granules also have a Flow Value (as tested in a plastic funnel unless otherwise indicated), as defined below, of less than 20 seconds, preferably less than 10 seconds and most preferably less than 5 seconds. The oil Sorbency Ratio, with respect to 20 weight motor oil (as defined below) is generally at least 1.4, preferably at least 1.6 and most preferably at least 1.8. The oil Sorbency Ratio is a measure of oil sorbency from a liquid bath and is not an indicator of the granules oil Surface Residue Value, however a granule used to absorb oil from a surface should have a minimum capacity to absorb oil.

Generally, the granules are formed by a process where self associating cellulosic plant fibers are reduced in size (e.g., to less than 10 mm, preferably less than 5 mm), intimately mixed with the non-film forming or non-self associating particulates and/or the non-self associating fibers, then agglomerated or granulated and finally densified and/or surface conditioned, to minimize cellulosic plant fiber protrusions and other fiber protrusions and provide a densified skin layer along the surface of the granules. These steps can be carried out simultaneously or sequentially in the order listed by generally known methods.

Where a paper mill waste sludge is used the size reduction of the fibers can be carried out by suitable equipment capable of reducing the size of fibers in a wet slurry having a solids content of from 2 to 50 weight percent, preferably from 5 to 40 weight percent. Suitable equipment would include a blender, a Fitzpatrick mill, a pinmill or a suitably equipped hammermill. For example, if a pinmill, or like equipment, is used the non-self associating fibers can be added with the self associating cellulosic plant fibers to simultaneously reduce the size of the self associating cellulosic plant fibers and non-self associating fibers (if the non-cellulosic fibers are sufficiently weak or brittle to be disintegrate in the pinmill). The action of the paddles or pins in the pinmill can also to a certain extent perform the steps of intimate mixing, agglomeration, gross densification of the agglomerates and surface compaction of the agglomerates/granules by folding in of fibers to smooth the granule surface. Otherwise conventional means can be used to perform each of these steps either separately or in conjunction with a pinmill or like device. For example the pinmill may partially perform all the above steps but any one particular step may require further action which could be performed by further passes through the pinmill or by a conventional device for the property requiring further enhancement (e.g., generally surface compaction and densification but which could also include in addition further agglomeration or intimate mixing).

As cellulosic plant fibers, particularly if wet, tend to form or associate into fiber masses preferably intimate mixing with the non-self associating fibers or particulates should be done in a high shear mixing device such as a pinmill or Fitzpatrick mill. Gross mixing can also be done by conventional mixing techniques prior to high shear mixture, if desired. The mixing can be done in a conventional manner but requires that the non self associating fibers or particulates be substantially randomly dispersed in the self associating plant fibers.

A separate agglomeration step can also be done with conventionally agglomerating devices including a rotating drum, a rotating disk or the like where the fibers and particulates are allowed to randomly associate and entangle forming the invention granules or agglomerate precursors of the invention granules. Agglomeration according to the invention does not include extrusion, molding or otherwise forming discrete uniformly densified pellets under pressure.

The densification of the agglomerates into granules can be done as a part of the agglomeration in a pinmill or in conventional rotating disks or drums or like devices used for simultaneous agglomeration/densification. The densification generally occurs following the agglomeration. Namely densification generally occurs after the agglomerates reach a critical size. This critical size is determined by the nature of the materials being agglomerated, the slurry liquid content, additives and the agglomeration conditions (e.g., disk rotation speed and size). When the agglomerates reach this critical stable size all further action is generally agglomerates impacting each other causing densification and surface compaction.

The densification of formed agglomerates can also be performed in a separate step by, e.g., a fluidized bed drier or a separate rotating horizontal drum or disk. If a rotating drum or disk is used, the densification of the cellulosic plant fiber granules can be aided by use of a water spray added at from 1 to 10 weight percent. The water may include surfactants or other materials to assist in wetting and subsequent folding in of the cellulosic and/or non-cellulosic fibers. Densification solely by use of a conventional rotating horizontal drum is less preferred as it tends to have little effect on the overall density of the agglomerates unless performed over extended periods of time. A rotating drum, however, can be effective to smooth and compact the skin layer of a formed agglomerate or a previously densified agglomerate by folding in of protruding fibers. The granules due to this densification will have a variable density over their diameter with a higher density outer surface and a lower density central core. This density gradient can be quite dramatic with the outer surface having a density of at least 50 percent greater than that of a central core.

EXAMPLES

Preparation of Granules

The granules were prepared by first blending a low ash sludge from paper making with additive material (if any). All quantities are based on dry weights. The sludge was pulping sludge from International Paper Co. (Natchez, Miss.). In Examples 1 through 8 and in Comparative Example C19 the additive material(s) was treated with a 2 percent solution of Syntergenth™ surfactant available from Henkel Chemical Corporation (Charlotte, N.C.) before combining with the sludge, the remaining examples were not treated. The mixture of sludge and additives was tumbled in a cement mixer, model RLX-3 made by Lion Hydraulics (Bloomington, Minn.), with a 40 cm diameter opening drum to dry blend the mixture. The sludge had an initial water content of 50 percent ±3 percent of the total by weight. The material mixture was tumbled for 5±1 minutes. The material mixture was then sprayed with water to increase the water content to 57 percent ±5 percent. The mixture was then passed through a rotating pinmill as shown in FIG. 1 at 800 RPM. The pinmill 1 has an inlet end 2 an outlet end 3. In the main mixing portion 4 there is a rotating shaft 5 with two helical rows of pins 6. The pinmill used had 71 pins arranged with a 40 degree offset between the two rows of pins. The two rows had an 80 degree helix angle. The diameter of the pinmill was about 8 inches (20 cm) with a 1.5 inch (3.8 cm) diameter shaft. The pins were cylindrical and about 3 inches (7.6 cm) long and 0.5 inches (1.3 cm) in diameter. The mixing portion of the pinmill was about 30 inches (76 cm).

The mixture had additional water added to 68±6 percent of the total weight of the mixture and was then passed through the pin mill again. In Examples 9 and greater and Comparative Examples C5 and greater, the material was then transferred to the cement mixer and tumbled for 10±5 minutes. The material was dried in a gas fired fluid bed drier with inlet air temperature below 350° F. (177° C.) to a water content of less than 3 percent moisture. The resultant granules were sieved to a mesh size of 8×40 (2.36 mm×0.419 mm), unless otherwise indicated.

Oil Sorbency Ratio Testing

Oil sorbency of the formed granules was tested according to ASTM F-726, part 9.1.2. The procedure used a 40 mesh wire basket of 7.62×10.16×2.54 cm. The basket was filled with the granular sorbent material. The test fluid and procedure for the mineral oil sorbency tests are as follows: the test fluid was Klearol™ white mineral oil, Light Mineral Oil NF, manufactured by Witco Corporation (Greenwich, Conn.). The sample was immersed for 2 minutes. The basket was removed from the oil and allowed to drain for 2 minutes and was reweighed.

Motor oil Sorbency Ratio test fluid and procedure modifications were as follows: the test fluid was 20W non-detergent motor oil available from Texaco Lubricants Corporation (Houston, Tex.). The sample was immersed in the test fluid for 5 minutes. The sample was removed from the fluid and drained for 30 seconds and reweighed. The oil sorbency is reported as a Sorbency Ratio which is the ratio of the weight of the oil containing sorbent divided by the initial sorbent weight.

Oil Surface Residue Value Testing

Five milliliters of the 20 weight non-detergent motor oil was placed into a 15 cm diameter and 20 mm deep Pyrex™ glass petri dish made by Corning Glass Corporation. After 20 seconds, 50 ml of sorbent material was placed over the oil and allowed to pick up the oil. Duration of the test is 8 hours, unless otherwise specified. No agitation of the material was done after initial placement. After the time elapsed, the dish was inverted and tapped lightly to dislodge the sorbent. The material remaining in the dish was weighed and is reported as the oil Surface Residue Value. The Surface Residue Values are reported in grams.

Density Testing

The apparent density of the granules was determined according to ASTM D2854. A 100 cc cylinder, described in this test, was used to do the testing but was filled only to 50 cc to preserve material.

Flow Value Testing

A test was devised to measure the tendency of dry granules to cling together. A 60 degree powder funnel was filled with test granules, using a finger or some other object to occlude the bottom opening to prevent the material from leaving the funnel. The funnels used were a Pyrex™ powder funnel 6220-100 made by Corning Corporation (Corning, N.Y.) (60 degrees, with a 100 mm top opening and a 12 mm stem opening with a stem length of 40 cm) and a plastic powder funnel model 4253-0100 (60 degrees, 100 mm top opening, stem opening 20 mm and stem length 35 mm) made by Nalgle Corporation (Rochester, N.Y.). Excess material above the rim of the funnel was removed with a rule or some other object with a flat edge. The opening was cleared and the time to empty was noted. The Flow Values (plastic or glass) are reported in seconds.

Examples 1 Through 4 and Comparative Examples C1 Through C2

These examples show the effect of melt-blown microfiber (BMF) additive on sorbency of mineral oil by cellulosic granules. The amount of BMF fibers is reported in Table 1 with the remainder of the granules being dry solids from the cellulosic paper sludge. Sorbency results are shown in Table 1.

TABLE 1

Effect of Polypropylene Blown Microfiber on Mineral Oil Sorbency Ratio

| Example | C1 | 1 | 2 | 3 | 4 | C2 |
|---|---|---|---|---|---|---|
| Percent BMF | 0 | 5 | 10 | 25 | 50 | 100 |
| Sorb. Ratio | 1.12 | 1.23 | 1.39 | 1.55 | 1.75 | 4.5 |

It is seen that addition of polypropylene BMF fiber improves bulk oil sorbency performance of the formed granules. There is no upper limit on the amount of BMF showing this improvement. The amount of improvement is not in excess of that calculated by the mixture rule of composite materials.

Examples 5 Through 8 and Comparative Examples C3 Through C4

These examples show the effects of BMF as a fibrous additive, and contact time, on the oil Surface Residue Value. The oil Surface Residue Value in grams are reported in Table 2.

TABLE 2

Effect of Polypropylene Blown Microfibers on Oil Surface Residue Value

| Ex. | % BMF | 30 Min | 1 Hr | 2 Hr | 4 Hr | 8 Hr | 24 Hr | 72 Hr |
|---|---|---|---|---|---|---|---|---|
| C3 | 0 | 7.23 | 3.67 | 3.58 | 1.28 | 1.06 | 0.37 | 0.30 |
| 5 | 5 | 4.32 | 1.82 | 2.07 | 0.34 | 0.09 | 0.03 | 0.02 |
| 6 | 10 | 4.84 | 3.30 | 2.54 | 0.22 | 0.05 | 0.04 | 0.03 |
| 7 | 25 | 3.27 | 1.06 | 2.38 | 0.01 | 0.03 | 0.06 | 0.04 |
| 8 | 50 | 3.41 | — | 2.70 | 0.10 | 0.03 | 0.01 | 0.03 |
| C4 | 100 | 6.07 | 5.12 | 5.29 | 6.04 | 4.08 | 5.55 | 4.47 |

Table 2 shows a dramatic reduction in the Oil Surface Residue Value when the sorbent sludge cellulosic granules contain BMF fibers (compare C3 with E5 through E8). However, Comparative Example 4 formed with BMF fibers alone did not exhibit this behavior and the oil Surface Residue Value was even worse than C3 with no BMF fibers.

Comparative Examples C5 Through C8

These comparative examples show oil Surface Residue Value as a function of contact time for a number of commercially available granular type materials sold as oil sorbents. In the table below, C5 is Eagle Pitcher Floor Dry 85, a clay material from Eagle-Pitcher Minerals, Inc. (Reno, Nev.); C6 is Safety-Kleen Absorbant 8830, a ground corn cob material from Safety-Kleen Corporation (Elgin, Ill.); C7 is Peat Sorb, a peat material from the Peat Sorb Division of Peat "T" Inc. (Edmondton, Alberta, Canada); and C8 is Biodac 16/30, a granular cellulosic material marketed by Granulation Technology Inc., Edward Lowe Industries Inc. (Cassopolis, Mich.). The Surface Residue Value in grams is given in Table 3.

TABLE 3

Oil Surface Residue Value for Various Sorbents

| Comp. Example | 30 Min | 1 Hr | 2 Hr | 4 Hr | 8 Hr | 24 Hr | 72 Hr |
|---|---|---|---|---|---|---|---|
| C5 | 2.53 | 0.20 | 0.96 | 0.14 | 0.06 | — | 0.04 |
| C6 | 8.19 | 8.88 | 4.28 | 6.57 | — | — | 1.92 |
| C7 | 2.91 | 1.17 | 1.44 | 3.86 | — | — | 0.17 |
| C8 | 15.09 | 13.15 | 14.2 | 9.76 | 9.19 | 5.98 | 3.72 |

Examples 9 Through 17 and Comparative Example C9

These examples study the effect of lower concentrations of BMF and higher concentrations of BMF on the oil Sorbency Ratio and oil Surface Residue Value. The granules formed in these examples (and all following examples) included the extra processing step of tumbling in the rotating cement mixer. Apparent density of the granules is given in gm/cc. The oil Sorbency Ratio was determined with both mineral oil (Min. Oil) and motor oil (Motor Oil). Oil Surface Residue Value is given in grams for an 8 hour test for 20 weight motor oil. The results are given in Table 4.

TABLE 4

Effect of BMF Concentration on Oil Sorption

| Example | Percent BMF | Density | Sorbency Ratio Min. Oil | Sorbency Ratio Motor Oil | Surface Residue Value |
|---|---|---|---|---|---|
| C9 | 0 | 0.35 | 1.71 | 1.91 | 0.257 |
| 9 | 1 | 0.39 | 1.37 | 1.63 | 0.015 |
| 10 | 2 | 0.31 | 1.62 | 1.92 | 0.018 |
| 11 | 3 | 0.34 | 1.54 | 1.85 | 0.018 |
| 12 | 4 | 0.35 | 1.37 | 1.74 | 0.009 |
| 13 | 5 | 0.30 | 1.55 | 2.07 | 0.017 |
| 14 | 10 | 0.28 | 1.75 | 2.22 | 0.011 |
| 15 | 25 | 0.28 | 1.98 | 2.36 | 0.005 |
| 16 | 75 | 0.20 | 2.6 | 3.29 | 0.009 |
| 17 | 90 | 0.18 | 3.07 | 3.92 | 0.006 |

This shows the effectiveness of BMF additives at concentrations as low as 1 percent and as high as 90 percent.

Examples 18 Through 25 and Comparative Examples C10 Through C11

These examples show the effect of polypropylene fibers as an additive. Polypropylene fibers, 3 denier in size and 0.76 mm in length, were obtained from Cellusuede Fibers Inc. (Rockford, Ill.). Evaluations were performed as in Examples 9 through 17 and the results are given in Table 5.

TABLE 5

Effect of Polypropylene Fibers on Oil Sorption

| Example | Percent Additive | Density | Sorbency Ratio Min. Oil | Sorbency Ratio Motor Oil | Surface Residue Value |
|---|---|---|---|---|---|
| 18 | 1 | 0.35 | 1.59 | 1.83 | 0.013 |
| 19 | 2 | 0.36 | 1.39 | 1.89 | 0.004 |
| 20 | 4 | 0.32 | 1.74 | 2.18 | 0.007 |
| 21 | 6 | 0.33 | 1.84 | 2.21 | 0.009 |
| 22 | 10 | 0.36 | 1.41 | 3.81 | 0.010 |
| 23 | 16 | 0.28 | 2.09 | 2.46 | 0.017 |
| 24 | 25 | 0.25 | 2.42 | 2.92 | 0.003 |
| 25 | 40 | 0.23 | 2.79 | 3.28 | 0.014 |
| C10 | 66 | 0.14 | 4.72 | 5.4 | 5.22 |
| C11 | 86 | 0.15 | 4.49 | 4.84 | 4.35 |

It can be seen that at high levels of the thicker fiber additive (unlike the thin BMF fiber) the granules lost their ability to absorb oil while leaving only a minimal oil Surface Residue Value. It is believed that this is due to increased numbers of fibers protruding from the surface of the granules due to the greater bending resistance of these fibers.

The flow characteristics of these granules were determined as described above. The Flow Value results are reported in seconds required to empty the funnel and are reported in Table 6. A flow reported as infinite is an indication of large amounts of fiber protruding from the surface of the fibers. These protruding fibers can become entangled and result in granules sticking together.

TABLE 6

Effect of Polypropylene Fibers on Flow Value

| Example | Percent Additive | Time (Glass Funnel) | Time (Plastic Funnel) |
|---|---|---|---|
| 24 | 25 | 9.5 | 3.4 |
| 25 | 40 | 12.7 | 4.0 |
| C10 | 66 | Infinite | Infinite |
| C11 | 86 | Infinite | Infinite |

Examples 26 Through 28 and Comparative Examples C12 Through C15

These examples show the effect of fiber length of the additive on the oil sorption properties. Polypropylene fibers 3 denier in size and various lengths were obtained from Cellusuede Fibers Inc. (Rockford, Ill.). Lengths are given in millimeters. The fiber additives were incorporated into the granules at 25 percent by weight solids. Evaluations were performed as in Examples 9 through 17 and the results are given in Table 7.

TABLE 7

Effect of Polypropylene Fiber Length on Oil Sorption

| Example | Length | Density | Sorbency Ratio Min. Oil | Sorbency Ratio Motor Oil | Surface Residue Value |
|---|---|---|---|---|---|
| 26 | 0.76 | 0.25 | 2.42 | 2.92 | 0.003 |
| 27 | 0.89 | 0.24 | 2.51 | 2.94 | 0.011 |
| 28 | 1.02 | 0.22 | 2.62 | 3.33 | 0.067 |
| C12 | 1.14 | 0.23 | 2.61 | 3.12 | 0.327 |
| C13 | 1.27 | 0.21 | 2.94 | 3.43 | 1.87 |

TABLE 7-continued

Effect of Polypropylene Fiber Length on Oil Sorption

| Example | Length | Density | Sorbency Ratio Min. Oil | Sorbency Ratio Motor Oil | Surface Residue Value |
|---|---|---|---|---|---|
| C14 | 1.4 | 0.21 | 2.98 | 3.55 | 5.28 |
| C15 | 1.52 | 0.19 | 3.17 | 3.83 | 5.06 |

It can be seen that if the additive fibers are to o long the granules lose their ability to absorb oil while leaving only a minimal Surface Residue Value.

The flow characteristics of the granules were determined as described above. The results are reported in seconds to empty the funnel and are reported in Table 8.

TABLE 8

Effect of Polypropylene Fiber Length on Flow Value

| Example | Length | Time (Glass Funnel) | Time (Plastic Funnel) |
|---|---|---|---|
| 26 | 0.76 | 9.5 | 3.4 |
| 27 | 0.89 | 11.5 | 3.8 |
| 28 | 1.02 | Infinite | 4.6 |
| C12 | 1.14 | Infinite | 5.1 |
| C13 | 1.27 | Infinite | Infinite |
| C14 | 1.4 | Infinite | Infinite |
| C15 | 1.52 | Infinite | Infinite |

Figure 2:
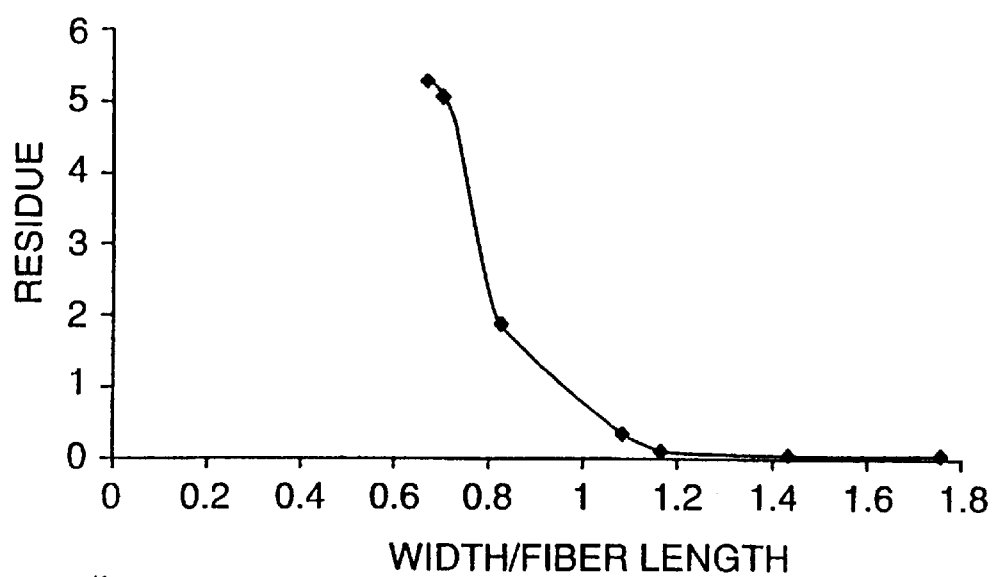
FIG. 2 is a graph of the granular width to fiber length ratios and the oil Surface Residue value.

The relationship between the length of the additive fibers and the size of the granules, and the effect of this relationship on the oil Surface Residue Value were also investigated. Examples 26 through 28 and Comparative Examples C12 through C15 containing polypropylene fibers of different lengths were measured with an optical microscope to determine the average granule size for each example. The granules were rice shaped and both an average minimum width and an average longest length were determined and reported in Table 9. It was found that the ratio of the width of the granules to the length of the additive fibers (LW ratio) correlates with the oil Surface Residue Value such as that LW ratio must be at least about 1.1. The results are give in Table 9 and in FIG. 2.

TABLE 9

Effect of LW-Ratio on Residue

| Example | Fiber Length (mm) | Granule Width (mm) | Granule Length (mm) | Granule LW ratio | Surface Residue Value |
|---|---|---|---|---|---|
| 26 | 0.76 | 1.34 | 1.75 | 1.76 | 0.003 |
| 27 | 0.89 | 1.27 | 1.62 | 1.43 | 0.011 |
| 28 | 1.02 | 1.18 | 1.58 | 1.16 | 0.067 |
| C12 | 1.14 | 1.23 | 1.88 | 1.08 | 0.327 |
| C13 | 1.27 | 1.04 | 2.12 | 0.82 | 1.87 |
| C14 | 1.40 | 0.93 | 2.16 | 0.67 | 5.28 |
| C15 | 1.52 | 1.07 | 2.42 | 0.70 | 5.06 |

This demonstrates that an important parameter in determining effectiveness in the oil Surface Residue Value test is the ratio of the smallest dimension of the granules to the length of the additive fibers, rather than the absolute length of the additive fibers. When this LW ratio is less than about 1.1 the granules lose their ability to leave only minimal oil surface residue. These results are shown graphically in FIG. 2.

Example 29 and Comparative Examples C16 Through C17

These examples show the effect of polyester terephthalate (PET) fibers of varying lengths as an additive. The PET fibers were obtained from Cellusuede Fibers Inc. (Rockford, Ill.). The fibers 0.76 and 1.52 mm in length were 3 denier, while the fibers 3.17 mm in length were 1.5 denier. The additive fibers were incorporated in the granules at a 25 percent by dry weight level and tested as above. The evaluations were performed as in Examples 9 through 17 and the results are given in Table 10 below.

TABLE 10

Effect of PET Fiber Length on Oil Sorption

| Example | Length | Density | Sorbency Ratio Min. Oil | Sorbency Ratio Motor Oil | Surface Residue Value |
|---|---|---|---|---|---|
| 29 | 0.76 | 0.31 | 1.74 | 2.04 | 0.011 |
| C16 | 1.52 | 0.30 | 1.72 | 2.18 | 2.21 |
| C17 | 3.17 | 0.20 | 2.07 | 2.79 | 2.91 |

The PET fibers acted similarly to the polypropylene fibers of Examples 24 and 26 through 28 at 25 percent by weight loading.

Examples 30 Through 31

These examples show the effect of hydrophobicity or hydrophilicity of the additive fibers. Rayon fibers which are hydrophilic and made from regenerated cellulose were obtained from Cellusuede Fibers Inc. (Rockford, Ill.) and compared with hydrophobic polypropylene (PP) fibers from the same source. Both fibers have an essentially smooth outer surfaces without protruding microscopic (<1 micrometer) fibrils such that they are not self associating by microfibril entanglement. Both fibers were 3 denier and 0.76 mm in length. They were each incorporated into granules at a 25 percent by weight solids level and tested as above. The results are given in Table 11.

TABLE 11

Effect of Hydrophilicity on Oil Sorption

| Example | Fiber | Density | Sorbency Ratio Min. Oil | Sorbency Ratio Motor Oil | Surface Residue Value |
|---|---|---|---|---|---|
| 30 | Rayon | 0.38 | 1.32 | 1.64 | 0.007 |
| 31 | PP | 0.25 | 2.42 | 2.92 | 0.003 |

It can be seen that both hydrophilic and hydrophobic discrete fiber additives are effective in reducing the oil Surface Residue Value in accordance with the invention.

Examples 32 Through 37 and C18

These examples show the effect of other man-made organic discrete fiber additives. Nylon fibers were 3 denier and 0.76 mm in length. Modacrylic™ (MA) fibers were high brightness acrylic fibers and were 3 denier and 0.76 mm in length. Kanecaron™ (KA) fibers were high brightness fibers and were 3 denier and 0.76 mm in length. All were obtained from Cellusuede Fibers Inc. (Rockford, Ill.). Regenerated cellulose sponge material (RCS) was obtained from the 3M Home Care Products Division (St. Paul, Minn.) as Ocello™ brand sponges, product 7244-T. It was dried under ambient conditions and was ground in a hammermill to pass through a 1.58 mm opening. This RCS material was roughly fibrous with the majority of particles having a length to width ratio greater than three. Fluff Pulp (FP) was polyethylene 13099 Shortstuff© fibers (average length 0.25 mm) obtained from Minifibers, Inc. (Johnson City, Tenn.). Polyolefinic Pulp TA-12 (POP) was obtained from Dupont Corporation (Wilmington, Del.). All additive materials were incorporated into granules at a 25 percent by weight solids level and tested as above. The results are given in Table 12.

TABLE 12

Effect of Various Organic Fibers on Oil Sorption

| Example | Additive | Density | Sorbency Ratio Min. Oil | Sorbency Ratio Motor Oil | Surface Residue Value |
|---|---|---|---|---|---|
| 32 | Nylon | 0.34 | 1.4 | 1.81 | 0.006 |
| 33 | MA | 0.33 | 1.45 | 1.88 | 0.012 |
| 34 | KA | 0.33 | 1.66 | 2.01 | 0.009 |
| 35 | RCS | — | — | — | 0.020 |
| 36 | FP | 0.27 | 2.17 | 2.74 | 0.021 |
| C18 | POP | 0.40 | 1.28 | — | 0.122 |
| 37 | POP | — | — | — | 0.009 |

It was observed that the remaining oil in the oil Surface Residue Value test for polyolefinic pulp (C18) was higher than expected. Microscopic analysis of the granules showed that the fibers seemed to have melted and as such the fibers became self associating, which interfered with absorption of the oil during the oil Surface Residue Value test. Granules containing the polyolefinic pulp were remade as described above but were dried below 212° F. (100° C.) to prevent melting of the fibers. The result of the oil Surface Residue Value test on this material is given in Table 12 as Example 37.

Example 38 and Comparative Example C19

These examples show the effect of organic particles as additives. Polyolefin powder designated as Microthene FN 510-00 was obtained from Quantum Chemical Specialty Polymers (Cincinnati, Ohio). The average particle size was approximately 20 micrometers and the particle size distribution was such that 89 percent of the particles was within a size range of 5 to 40 micrometers. A second size, designated Microthene 722-00 ground to 50 mesh, or about 300 micrometers, was obtained from the same source. Each was incorporated into granules at a 25 percent level and tested as above. Results are given in Table 13.

TABLE 13

Effect of Organic Particles on Oil Sorption

| Example | Size (micrometers) | Density | Sorbency Ratio Min. Oil | Sorbency Ratio Motor Oil | Surface Residue Value |
|---|---|---|---|---|---|
| 38 | 20 | 0.42 | 1.18 | 1.40 | 0.009 |
| C19 | 300 | 0.37 | 1.33 | — | 0.854 |

It can be seen that the small size organic particle additive is effective in this invention but the ability to leave only a minimal oil Surface Residue Value was reduced at the larger particle size.

Example 39

This example shows the effect of inorganic fiber additives. Glass fibers were obtained from Fibre Glast Corporation (Dayton, Ohio) and had an average length of 0.79 micrometers. They were incorporated into granules at a 10 percent level and tested as above. Results are given in Table 14.

TABLE 14

Effect of Inorganic Fibers on Oil Sorption

| Example | Density | Sorbency Ratio Min. Oil | Sorbency Ratio Motor Oil | Surface Residue Value |
|---|---|---|---|---|
| 39 | 0.32 | 1.81 | 2.11 | 0.008 |

Examples 40 Through 41

These examples show the effect of inorganic particle additives. Ceramic microspheres designated as Z light W-1012 were obtained from 3M Company (St. Paul, Minn.). The volume average diameter was 57 micrometers. A second size designated Z light W-1600 was obtained from the same source and had a volume average diameter of 173 micrometers. Each was incorporated into granules at a percent level. Performance results are given in Table 15.

TABLE 15

Effect of Inorganic Particles on Oil Sorption

| Example | Size (micrometers) | Density | Sorbency Ratio Min. Oil | Sorbency Ratio Motor Oil | Surface Residue Value |
|---|---|---|---|---|---|
| 40 | 57 | 0.32 | 1.94 | 2.16 | 0.037 |
| 41 | 173 | 0.32 | 1.76 | 2.06 | 0.022 |

Comparative Example C20

This Comparative Example demonstrates the effect of using a sludge with a high ash (i.e., a film forming clay) content. A high ash mixed sludge was obtained from the Fort Howard Corporation (Green Bay, Wis.). The ash content was 47 percent. Granules were prepared from this sludge incorporating 50 percent BMF fibers that were pretreated with the Syntergent™ surfactant. Results are given in Table 16.

TABLE 16

Effect of High Ash Sludge

| Example | Density | Sorbency Ratio Min. Oil | Sorbency Ratio Motor Oil | Surface Residue Value |
|---|---|---|---|---|
| C20 | 0.36 | 1.21 | 1.56 | 1.25 |

Examples 42 Through 43 and Comparative Example C21

These examples show the effect of adding film forming latex particles. The latex was HA-16 acrylic latex from Rohm and Haas Corporation (Philadelphia, Pa.). The latex was incorporated into the granules during the time the materials were tumbled in a rotating cylinder. The results are given in Table 17.

TABLE 17

Effect of Latex Addition

| Example | Additive | Surface Residue Value |
|---|---|---|
| C21 | 10% Latex | 0.968 |
| 42 | 10% BMF 5% Latex | 0.019 |
| 43 | 10% BMF 10% Latex | 0.011 |

This shows that the film forming latex particles alone are not an effective additive in this invention, but that in the presence of an effective non film-forming additive, such as BMF fibers, the latex may also be present.

Examples 44 Through 47

These examples show the effect of size of the granules. Granules were prepared as described above incorporating 25 weight percent BMF and were sieved to the stated mesh size. Results are given in Table 18.

TABLE 18

Effect of Granule Size

| Example | Granule Size (mm) | Surface Residue Value |
|---|---|---|
| 44 | 2.0–2.4 | 0.009 |
| 45 | 0.85–2.0 | 0.013 |
| 46 | 0.6–0.85 | 0.011 |
| 47 | 0.42–0.6 | 0.011 |

This shows that the oil Surface Residue Values are not appreciably affected by granule size.

Examples 48 Through 50 and Comparative Examples C22

These examples show the effect of additive fibers with mixed lengths. Granules as reported in Table 19 were prepared containing mixtures of 1.02 mm (fibers providing a LW ratio greater than 1.1) and 1.52 mm polypropylene fibers (fibers providing a LW ratio more than 40 percent less than 1.1) with a total additive fiber content of 25 percent by weight solids. The effect on the oil Surface Residue Value test is given in Table 19.

TABLE 19

Effect of Mixed Lengths on Oil Surface Residue

| Example | Percent 1.02 Fiber | Percent 1.52 Fiber | Surface Residue Value |
|---|---|---|---|
| 48 | 24 | 1 | 0.040 |
| 49 | 23 | 2 | 0.071 |
| 50 | 20 | 5 | 0.306 |
| C22 | 15 | 10 | 0.777 |

Examples 51 Through 52

These examples show the effects of granule preparation procedure. A blend of 75 weight percent sulfite pulping waste cellulose, obtained from Weyerhaeuser Corp. (Rothschild, Wis.) and 25 percent BMF fibers was mixed with water to approximately 10 percent solids. This mixture was processed in an Osterizer blender made by John Oster Mfg. Corp. (Milwaukee, Wis.) for three minutes on the High setting. This step accomplished both a thorough blending of the materials and a shredding of the pulp waste so no large particles were evident. The material was transferred to a Buchner Funnel and excess water was removed by vacuum. Water content was measured to be 68.5 percent of the total weight. The material was pressed by hand through a screen with 2.36 mm openings. 300 grams of the material was then transferred to a one gallon glass jar with inside dimensions of 19 cm wall height and a diameter of 14 cm. The jar was rotated in a horizontal orientation at 65 RPM for 15 hours. Water was added to the system by means of a spray bottle to a final water content of 75.1 weight percent. The material was removed from the jar and dried in a tray drier at 250° F. (121° C.) for one hour. A final moisture content of 0.5 percent was obtained. The granules were evaluated and the results are reported in Table 20 as Example 51.

Weyerhaeuser pulping waste cellulose was blended with 25 percent BMF and granulated by the procedures described in the prior examples. The granules were evaluated and the results are reported in Table 20 as Example 52.

TABLE 20

Effect of Granulation Procedure

| Example | Density | Sorbency Ratio Motor Oil | Surface Residue Value |
|---|---|---|---|
| 51 | 0.21 | 4.54 | 0.000 |
| 52 | 0.36 | 2.36 | 0.001 |

The gentle action of the rotating glass drum did not significantly densify the granules however the surface was compacted and the granules of Example 51 provided excellent Surface Residue Values.

Comparative Example C23

A commercially available cellulosic oil sorbent, Absorbent GP, sold by Absorbent Products Company (Bellingham, Wash.) was sieved to a mesh size of 8 mesh or smaller (less than 2.4 mm) to remove the large particles and tested for its oil Surface Residue Value. The oil Surface Residue Value, after 8 hours was 3.0 grams.

Example 53

Cotton fiber containing granules were prepared by tumbling 204 g raw Cotton fibers (Easy Street™, available from Veritec, Walpole, Mass.) that had been hammermilled dry to reduce the average fiber length to 0.31 mm, with 612 g of papermill sludge obtained from International Paper (Natchez, Miss.). The materials were then blended in a cement mixer, model RLX-3 made by Lion Hydraulics (Bloomington, Minn.) with a 40 cm diameter opening. The combined materials had a water content of 50.3 percent of the total weight. The materials were tumbled in the cement mixer for 5±1 minutes. The materials were then sprayed with water to increase the water content to approximately 60 weight percent. The material was then passed through a pinmill rotating at 800 rpm. The material had additional water added to a total of 70 weight percent of the sample. The material was passed through the pinmill again with added water. The material was then passed through the pinmill a third time without water addition. The material was then transferred to the cement mixer again and tumbled for 15 minutes. The material was dried in a convection tray drier at 120° C. for three hours. The material was sieved to granules less than 2.4 mm in diameter and tested for its oil Surface Residue Value. The sample oil Surface Residue Value was 0.010 grams. The apparent density of the granules was 0.31 g/cc. The raw cotton cellulosic fibers were observed under a microscope and had no observable fibrils. Generally, cotton requires wet pulping in order for fibrils to form such that the cotton fibers become self associating.

Examples 54–58 and Comparative Examples C24–C28

These examples show the ability of the novel oil sorbent granules of the invention to absorb aqueous fluids and leave a low Surface Residue Value.

The aqueous Surface Residue Value testing was performed as follows. Five milliliters of deionized water containing 0.25% Syntergent surfactant was placed into a 15 cm diameter and 20 mm deep Pyrex™ glass petri dish made by Corning Inc. Fifty milliliters of sorbent material was placed over the fluid and allowed to pick up the fluid. Duration of the test was 5 minutes. No agitation of the material was done after initial placement. After the time elapsed, the dish was inverted and tapped lightly to dislodge the sorbent. The material remaining in the dish was weighed and is reported as the aqueous Surface Residue Value. The Surface Residue Values are reported in grams.

In Example 54, the granules of Example 5, containing 5% BMF fibers, were tested using the above aqueous Surface Residue Value test. In Example 55, the granules of Example 26, containing 25% polypropylene fibers 3 denier in size and 0.76 cm (0.030 in) long, were tested in this test. In Example 56, the granules of Example 35, containing 25% regenerated cellulose sponge material, were tested. In Example 57, the granules of Example 40, containing 10% ceramic microspheres, were tested. In Example 58, the granules of Example 52, containing Weyerhaeuser pulping waste cellulose and 25% BMF fibers, were tested.

In Comparative Example C24, the granules of Example C3, containing no additive, were tested by the aqueous Surface Residue Value test. In Example C25, the granules of Example C5, the Eagle Pitcher Floor Dry 85 material, were tested. In example C26, the granules of Example C6, the Safety-Kleen Absorbent 8830, were tested. In Example C27, the granules of Example C8, the Biodac 16/30 material, were tested. In Example C28, the granules of Example C23, the Absorbent GP material, were tested. The results are given in Table 21.

TABLE 21

Sorption of Aqueous Fluid

| Example | Surface Residue Value |
|---------|----------------------|
| 54 | 0.007 |
| 55 | 0.002 |
| 56 | 0.002 |
| 57 | 0.006 |
| 58 | 0.005 |
| C24 | 0.173 |
| C25 | 0.172 |
| C26 | 0.668 |
| C27 | 1.2 |
| C28 | 4.25 |

It can be seen that granules of the invention are effective in absorbing aqueous fluids and leaving a low aqueous Surface Residue Value, while the comparative examples are not as effective.

Examples 59–63 and Comparative Examples C29–C32

These examples show the ability of the novel sorbent granules of the invention to absorb artificial blood and leave a low Surface Residue Value.

An aqueous synthetic blood composition was prepared as follows. To 2.0 liters of deionized water was added 50.0 grams Acrysol G-110 (from Rohm & Hass Co., Philadephia, Pa.) and the mixture was shaken until uniformly mixed. Then 20.0 grams Direct Red 81 dye (from Aldrich Chemical Co., Milwaukee, Wis.) was added and the mixture was shaken until uniformly mixed. The surface tension was then adjusted to 40–48 dynes/cm by the addition of the surfactant Brij No. 30 as obtained from Aldrich Chemicals. The composition was used within 10 days of its preparation.

The Surface Residue Value testing was performed as described above except that five millileters of artificial blood was substituted for the aqueous 0.25% Syntergent surfactant solution as the test fluid.

In Example 59, the granules of Example 5, containing 5% BMF fibers, were tested in the artificial blood Surface Residue Value test. In Example 60, the granules of Example 26, containing 25% polypropylene fibers 3 denier in size and 0.76 cm (0.030 in) long, were tested in this test. In Example 61, the granules of Example 35, containing 25% regenerated cellulose sponge material, were tested. In Example 62, the granules of Example 40, containing 10% ceramic microspheres, were tested. In Example 63, the granules of Example 52, containing Weyerhaeuser pulping waste cellulose and 25% BMF fibers, were tested.

In Comparative Example C29, the granules of Example C5, the Eagle Pitcher Floor Dry 85 material, were tested in the artificial blood Surface Residue Value test. In Example C30, the granules of Example C6, the Saftey-Kleen Absorbent 9930, were tested. In Example C31, the granules of Example C8, the Biodac 16/30 material, were tested. In Example C32, the granules of Example C23, the Absorbent CG material, were tested. The results are given in Table 22.

TABLE 22

Sorption of Artificial Blood

| Example | Surface Residue Value |
|---------|----------------------|
| 59 | 0.009 |
| 60 | 0.51 |
| 61 | 0.43 |
| 62 | 0.018 |
| 63 | 0.007 |
| C29 | 8.83 |
| C30 | 3.5 |
| C31 | 8.29 |
| C32 | 3.41 |

It can be seen that granules of the invention are effective in absorbing artificial blood and leaving a low surface residue value, while comparative examples are not as effective.

What is claimed is:

1. A method for making free flowing incineratable absorbent granules comprising:
   (a) mixing cellulosic plant fibers and a non-self associating fiber or non-film forming particulate;
   (b) agglomerating the mixed plant fibers and non-self associating fibers or non-film forming particulates into agglomerates;
   (c) densifying the agglomerates into granules;

(d) compacting the plant fibers on the surface of the granules providing a smooth free flowing granule; and (e) drying the formed granules which granules have an oil Surface Residue Value of less than 0.5 grams, an average density of from about 0.15 to 0.5 grams per cubic centimeter and are free flowing.

2. The method of claim 1 wherein two or more of steps (a) through (d) are performed simultaneously.

3. The method of claim 1 wherein steps (a) through (d) are performed sequentially.

4. The method of claim 1 wherein the mixture comprises 10 to 99 weight percent of self associating cellulosic plant fibers and 1 to 90 weight percent of non-film forming and non-self associating particulates having an average aspect ratio of less than 3.

5. The method of claim 4 wherein the non-self associating particulates have an average diameter of from 2 to 250 micrometers and comprise 1 to 50 weight percent of the granules.

6. The method of claim 1 wherein the formed granules have an average diameter of from 0.1 to 8 millimeters.

7. The method of claim 4 wherein the particulates have an average diameter of from 5 to 200 micrometers.

8. The method of claim 1 wherein the total weight percent of inorganic materials in the mixture is less than 36 percent by weight.

9. The method of claim 1 wherein the mixture comprises 99 to 10 weight percent of self associating cellulosic plant fibers and 1 to 90 weight percent of non-self associating fibers having an average aspect ratio of greater than 3, wherein the ratio of the average narrowest width of the formed granule to the average length of the non-self associating fibers (LW ratio) is from 1.1 to 1200.

10. The method of claim 9 wherein the mixture comprises 98 to 50 weight percent of self associating cellulosic plant fibers and 2 to 50 weight percent of non-self associating fibers having an aspect ratio of greater than 3 wherein the LW ratio is from 1.2 to 50.

11. The method of claim 10 wherein less than 10 percent of the non-self associating fibers are more than 50 percent longer than the average fiber length providing an LW ratio of 1.1.

12. The method of claim 11 wherein less than 10 percent of the non-self associating fibers are more than 30 percent longer than the average fiber length providing an LW ratio of 1.1.

13. The method of claim 1 wherein the plant fibers are wood pulp fibers.

14. The method of claim 13 wherein the wood pulp fibers are waste sludge fibers.

15. The method of claim 9 wherein the plant fibers are wood pulp fibers and the non-self associating fibers are synthetic organic fibers having an average fiber diameter of greater than 1 micrometer.

16. The method of claim 5 wherein the non-self associating fibers constitute 1 to 70 percent by weight of the granules.

17. The method of claim 11 wherein the non-self associating fibers constitute 1 to 40 percent by weight of the granules.

18. The method of claim 15 wherein the non-self associating fibers constitute 1 to 25 percent by weight of the granules.

19. The method of claim 10 wherein the granules are densified to an average density of from 0.2 to 0.45 grams per cubic centimeter.

20. The method of claim 10 wherein the granules are densified to an average density of from 0.3 to 0.45 grams per cubic centimeter.

21. The method of claim 1 wherein the formed granules have an oil Surface Residue Value of less than 0.2 grams.

22. The method of claim 1 wherein the formed granules have an oil Surface Residue Value of less than 0.1 grams.

23. The method of claim 1 wherein the formed granules have a plastic Flow Value of less than 20 seconds.

24. The method of claim 1 wherein the formed granules have a plastic Flow Value of less than 5 seconds.

25. A method of removing a fluid from a surface comprising providing free flowing incineratable absorbent granules comprising cellulosic plant fibers and non-self associating fibers or particulates, having a density of from about 0.15 to 0.5 grams per cubic centimeter spreading the absorbent granules over a fluid containing surface for a time sufficient to absorb substantially all the fluid, wherein the granules have an oil Surface Residue Value of less than 0.5 grams removing the absorbent granule from the surface to provide a substantially fluid-free surface.

26. The method of claim 25, wherein the fluid is an oil.

27. The method of claim 25, wherein the fluid is an aqueous fluid.

28. The method of claim 27, wherein the granules have an aqueous Surface Residue Value of less than 0.1 grams.

29. The method of claim 27, wherein the granules have a synthetic blood Surface Residue Value of less than about 0.5 grams.

30. The method of claim 25 wherein the granules comprise 10 to 99 weight percent of self associating cellulosic plant fibers and 1 to 90 weight percent of non-film forming and non-self associating particulates having an average aspect ratio of less than 3.

31. The method of claim 25 wherein the non-self associating particulates have an average diameter of from 2 to 250 micrometers and comprise 1 to 50 weight percent of the granules.

32. The method of claim 25 wherein the granules have an average diameter of from 0.1 to 8 millimeters.

33. The method of claim 31 wherein the particulates have an average diameter of from 5 to 200 micrometers.

34. The method of claim 30 wherein the total weight percent of inorganic materials forming the granules is less than 36 percent.

35. The method of claim 25 wherein the granules comprise 99 to 10 weight percent of self associating cellulosic plant fibers and 1 to 90 weight percent of non-self associating fibers having an average aspect ratio of greater than 3, wherein the ratio of the average narrowest width of the formed granule to the average length of the non-self associating fibers (LW-Ratio) is from 1.1 to 1200.

36. The method of claim 35 wherein the granules comprise 98 to 50 weight percent of self associating cellulosic plant fibers and 2 to 50 weight percent of non-self associating fibers having an aspect ratio of greater than 3 wherein the LW ratio is from 1.2 to 50.

37. The method of claim 36 wherein less than 10 percent of the non-self associating fibers are more than 50 percent longer than the average fiber length providing an LW ratio of 1.1.

38. The method of claim 37 wherein the granules have a densified, smooth outer surface with substantially no fibers protruding more than 1.0 mm from the densified smooth outer surface of substantially all the granules.

39. The method of claim 38 wherein the non-self associating fibers protrude by less than 0.5 mm on average from the densified granule surface.

40. The method of claim 35 wherein the total amount of inorganic fibers is less than 36 weight percent of the granule.

41. The method of claim 25 wherein the plant fibers are wood pulp fibers.

42. The method of claim 41 wherein the wood pulp fibers are waste sludge fibers.

43. The method of claim 25 wherein the granules ash content is less than 30 percent by weight.

44. The method of claim 35 wherein the plant fiber material is a size of less than 10 mm.

45. The method of claim 35 wherein the plant fibers are wood pulp fibers and the non-self associating fibers are synthetic organic fibers having an average fiber diameter of greater than 1 micrometer.

46. The method of claim 36 wherein the non-self associating fibers constitute 1 to 70 percent by weight of the granules.

47. The method of claim 46 wherein the non-self associating fibers constitute 1 to 40 percent by weight of the granules.

48. The method of claim 45 wherein the non-self associating fibers constitute 1 to 25 percent by weight of the granules.

49. The method of claim 36 wherein the average density of the granules is from 0.2 to 0.45 grams per cubic centimeter.

50. The method of claim 36 wherein the average density of the granules is from 0.3 to 0.45 grams per cubic centimeter.

51. The method of claim 25 wherein the granules oil Surface Residue Value is less than 0.2 grams.

52. The method of claim 25 wherein the granules oil Surface Residue Value is less than 0.1 grams.

53. The method of claim 25 having a plastic Flow Value of less than 20 seconds.

54. The method of claim 25 having a plastic Flow Value of less than 10 seconds.

55. The method of claim 25 having a plastic Flow Value of less than 5 seconds.

* * * * *

UNITED STATES PATENT AND TRADEMARK OFFICE
CERTIFICATE OF CORRECTION

PATENT NO.    : 6,092,302
DATED         : July 25, 2000
INVENTOR(S)   : Berrigan, Michael R.

It is certified that error appears in the above-identified patent and that said Letters Patent is hereby corrected as shown below:

Column 2,
Line 61, delete "liter" and insert in place thereof -- litter --.

Column 3,
Line 6, delete "liter" and insert in place thereof -- litter --.

Column 8,
Line 59, delete "Syntergenth $^{TM}$" and insert in place thereof -- Syntergent$^{TM}$ --.

Column 13,
Line 11, delete "to o" and insert in place thereof -- too --.

Column 16,
Line 24, insert -- 10 -- following "a" and preceding "percent".

Column 18,
Line 5, delete "Buchner" and insert in place thereof -- Büchner --.

Signed and Sealed this

Twenty-sixth Day of November, 2002

Attest:

JAMES E. ROGAN
Attesting Officer    Director of the United States Patent and Trademark Office